UNITED STATES PATENT OFFICE.

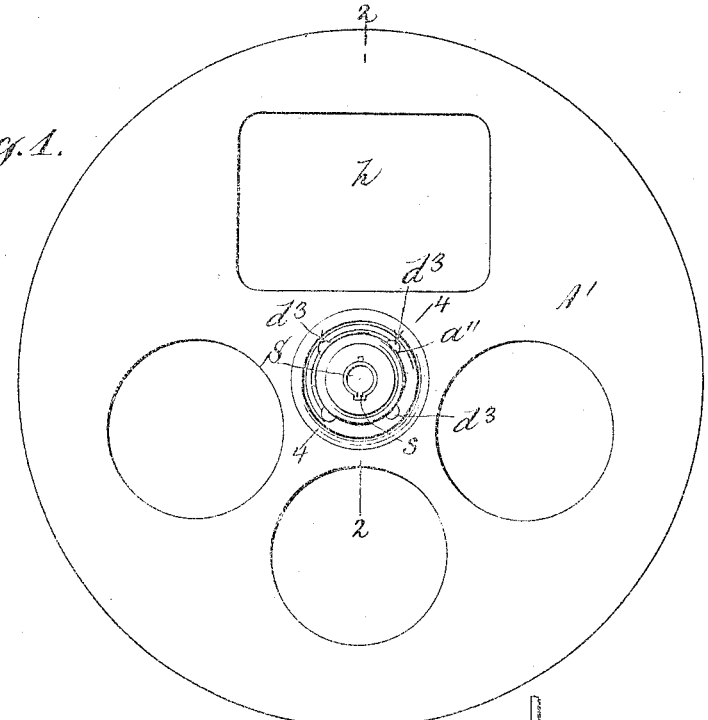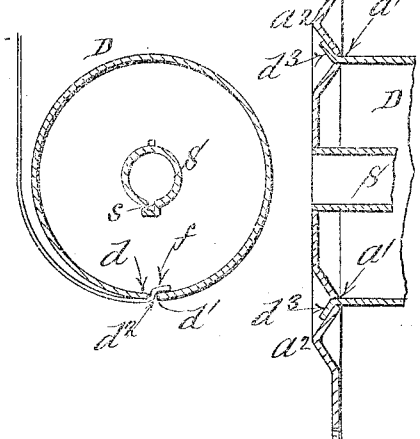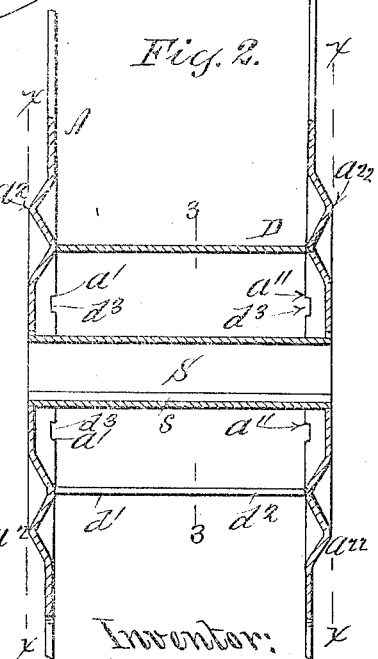

THOMAS SHARLOW, OF NEW YORK, N. Y.

FILM-REEL FOR MOVING-PICTURE MACHINES.

971,317.   Specification of Letters Patent.   Patented Sept. 27, 1910.

Application filed April 6, 1910. Serial No. 553,834.

*To all whom it may concern:*

Be it known that I, THOMAS SHARLOW, a citizen of the United States, residing in the borough of Manhattan, city, county, and State of New York, have invented certain new and useful Improvements in Film-Reels for Moving-Picture Machines, of which the following is a specification.

The object of my invention is to afford a film reel, for use in moving picture machines, which is not only simple and economical in manufacture, but which also attains certain other practical advantages in use.

The invention consists in the specific construction and arrangement of parts hereinafter described and claimed, distinguishing features being the manner in which the hollow film drum and concentric spindle sleeve are attached to the side disks, the formation of the latter with protruding hubs or bearing surfaces within the line of circumference of the film drum for the purpose of preventing frictional contact with the peripheral portions of the disks beyond the drum; the formation of the hollow film drum with a longitudinal slot for the reception and retention of the end of the film, and the provision of a spindle sleeve extending axially within the hollow film drum from one side disk to the other and formed with a spline groove extending its whole length for the reception and guidance of the key upon the usual reel actuating spindle, all substantially as hereinafter set forth.

In the accompanying drawings, Figure 1, is a side elevation of my improved film reel; Fig. 2, is a fragmentary section upon an enlarged scale, taken upon plane of line 2, 2, Fig. 1; Fig. 3, is a transverse fragmentary section taken upon the plane of line 3, 3, Fig. 2. Fig. 4, is a fragmentary section upon plane of line 4, 4, Fig. 1, upon an enlarged scale, showing one of the side disks.

The film drum D, consists of a strip of metal bent into cylindrical shape, the ends $d$, $d'$, of the strip being brought near, but not quite together, so as to form a longitudinal slot $d^2$, between them. Tongues $d^3$, $d^3$, protrude from the side of the strip and enter slits $a'$, $a''$, formed for their reception in the side disks A and A′, which latter are counterparts of each other except that they are reversed in position with relation to each other. Three or more of these tongues $d^3$, $d^3$, may be provided as may be found most expedient, the ends, after passing through the slits $a'$, $a''$, being bent over upon the external faces of the disks to bind the latter to the annular edges of the film drum strip. The central portions of the disks A, A′, within the line of circumference of the film drum D, bulge or protrude outward beyond the protruding tongues $d^3$, $d^3$, to form hub bearings $a^2$, $a^{22}$, which protect the said tongues $d^3$, $d^3$, and the concentric peripheral portions of the disks from frictional contact with parts extraneous to the reel, as will be understood by reference to Fig. 2, in which the dotted lines $x$, $x$, represent extensions of the planes of the external bearing surfaces $a^2$, $a^{22}$, of the hub sections of the reel. If desired the side members may be bent outward slightly beyond the film drum D, to form an external groove as shown in Fig. 2, to more effectually isolate and protect the tongues $d^3$, $d^3$, as well as to stiffen the disks at lines of contact with the film drum strip. The bends should be within the planes $x$, $x$, of the hub sections $a^2$, $a^{22}$, as clearly indicated in said Fig. 2, so that the tongues $d^3$, $d^3$, are practically countersunk within the protruding central hub bearing surfaces.

Another special feature of my construction consists in forming the hub section with a spindle sleeve S, extending all the way through, from one hub bearing surface $a^2$, to the other $a^{22}$, and in forming this spindle sleeve S, with a longitudinal spline groove $s$, for the reception and guidance of the key or projection on the usual reel actuating spindle of the machine. This distributes and equalizes the strain imposed by the spindle and facilitates the placing of the reel upon the spindle as compared with reels in which the side disks are formed only with central openings for the actuating spindle.

In use the end edge $f$, of a film is inserted in the slot $d^2$, created by and between the spaced ends $d$, $d'$, of the strip of which the drum is composed as indicated in Fig. 3,— this connection being sufficient to maintain the relation of the parts until the completion of the first rotation of the reel, when the second and subsequent convolutions of the film around the drum D, will insure and maintain the connection until the film is subsequently unwound. In this connection it is obvious that the film slot $d^2$, may be otherwise formed in the periphery of the film drum D, with like result in so far as its function is concerned, but by forming it by spacing the ends d, d', of the drum sheet as hereinbefore described, I simplify and cheapen the manufacture of the reel. In fact, the whole device is simple and compact, the hub section being especially rigid and strong and protecting the outer portions of the disks against frictional contact with parts of the apparatus extraneous to the reel. Furthermore, the splined spindle sleeve S, not only adds to the strength and stability of the hub section, but greatly simplifies and facilitates the operations of placing the reel upon or removing it from the actuating spindle.

The whole reel being made of metal is absolutely fire proof, for obvious reasons a great advantage in moving picture machines.

To facilitate the insertion and removal of the film, and the manipulation thereof, the side disks are formed with hand openings $h$, which coincide in position as related to each other.

What I claim as my invention and desire to secure by Letters Patent is,

A film reel for moving picture machines comprising a film drum and side disks, said drum consisting of a sheet of metal bent into cylindrical shape and formed with end tongues engaging with slits formed for their reception in the side disks, the edges of said drum sheet being spaced apart to form a longitudinal slot, said side disks each formed with a protruding central hub bearing having an annular groove in which the tongues on the drum are countersunk, and a spindle sleeve extending axially between and secured to the said protruding hub bearings of the side disks, and formed with a continuous longitudinal spline groove, substantially in the manner and for the purpose described.

THOMAS SHARLOW.

Witnesses:
 D. W. GARDNER,
 GEO. WM. MIATT.